UNITED STATES PATENT OFFICE.

EDWARD N. TRUMP AND DUNCAN W. PECK, OF SYRACUSE, NEW YORK.

METHOD OF ESTABLISHING UNITS OF MEASURE IN COMPOUNDING PORTLAND CEMENT.

SPECIFICATION forming part of Letters Patent No. 427,380, dated May 6, 1890.

Application filed December 2, 1889. Serial No. 332,332. (No specimens.)

*To all whom it may concern:*

Be it known that we, EDWARD N. TRUMP and DUNCAN W. PECK, of Syracuse, in the county of Onondaga, in the State of New York, have invented new and useful Improvements in Methods of Establishing Units of Measure in Compounding Portland Cement, of which the following is a full, clear, and exact description.

This invention relates to the manufacture of compounded hydraulic cements, more especially Portland cement.

The object of this invention is to obtain perfect control of the proper proportioning and mixing of the ingredients of the cement to be compounded, and thus insure the production of cement of uniform quality; and to that end our invention consists, chiefly, in establishing units of measure in each ingredient preparatory to mixing the same, which units of measure we obtain by converting the materials from the condition in which they are obtained from the bank or pit into definite forms of uniform sizes in each material, all as hereinafter more fully described, and specifically set forth in the claims.

In carrying out our invention we proceed as follows: We convert each material into definite forms of uniform sizes, as aforesaid, preferably by passing the material through a suitable molding or pressing or cutting machine, each of said forms constituting a unit of measure in each material, preparatory to compounding the same, which latter is effected by a suitable mixing-machine. The forms of the different ingredients may be of the same size, and in that case they will be introduced simultaneously into the mixing-machine in numbers corresponding to the proportion desired in the compound, or the proportioning may be effected by varying the sizes of the forms of the different ingredients. It will thus be observed that by the aforesaid treatment of the ingredients we obtain perfect control of the proper proportioning of the same in compounding the cement, and we therefore are enabled to produce cement of uniform quality in an economical and convenient manner.

The aforesaid compound is subsequently dried, calcined, and ground to the requisite commercial condition.

What we claim as our invention is—

1. In the manufacture of Portland or analogous compound hydraulic cement, the preliminary step of establishing units of measure in the separate ingredients, consisting in molding or cutting each of the ingredients into definite forms of uniform sizes preparatory to mixing the same, as set forth.

2. In the manufacture of Portland or analogous compound hydraulic cement, the preliminary step of establishing units of measure in the separate ingredients, consisting in molding or cutting each ingredient separately into definite forms of uniform sizes and varying the sizes of the forms of the different ingredients according to the proportions in which they are to be compounded, as set forth.

In testimony whereof we have hereunto signed our names this 26th day of November, 1889.

EDWARD N. TRUMP. [L. S.]
DUNCAN W. PECK. [L. S.]

Witnesses:
W. D. GILLIS,
FRANK STRAHL.